(12) United States Patent
Krishna et al.

(10) Patent No.: US 7,670,679 B2
(45) Date of Patent: Mar. 2, 2010

(54) CORE-SHELL CERAMIC PARTICULATE AND METHOD OF MAKING

(75) Inventors: Kalaga Murali Krishna, Bangalore (IN); James Anthony Ruud, Delmar, NY (US); Geetha Karavoor, Kasaragod District (IN); Balachandar Ramadurai, Bangalore (IN); Mohan Manoharan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 711 days.

(21) Appl. No.: 11/442,732

(22) Filed: May 30, 2006

(65) Prior Publication Data

US 2007/0281160 A1    Dec. 6, 2007

(51) Int. Cl.
*B32B 5/66* (2006.01)

(52) U.S. Cl. ............... 428/403; 428/404; 428/405; 428/406; 428/407; 427/212; 106/409

(58) Field of Classification Search ............ 428/403, 428/404, 407; 427/212; 106/409
See application file for complete search history.

(56) References Cited

U.S. PATENT DOCUMENTS

| | | | |
|---|---|---|---|
| 4,257,874 A | 3/1981 | Bergna | |
| 4,629,464 A | 12/1986 | Takata et al. | |
| 6,479,146 B1 * | 11/2002 | Caruso et al. | 428/403 |
| 2002/0160905 A1 | 10/2002 | Loyalka et al. | |
| 2003/0082237 A1 | 5/2003 | Cha et al. | |
| 2005/0077221 A1 | 4/2005 | Berg et al. | |
| 2005/0170178 A1 | 8/2005 | Chen et al. | |

FOREIGN PATENT DOCUMENTS

| | | |
|---|---|---|
| EP | 0972563 A1 | 1/2000 |
| JP | 2005015322 A | 6/2003 |
| WO | WO 2005/118702 A2 | 12/2005 |

OTHER PUBLICATIONS

Chen et al "A facile grafting . . ."Microporous and Mesoporous Materials 76 (2004)209-213.*
Jong-Sung Yu et al "Fabrication of Bimodal Porous Silicate . . ." JPhys.Chem. B2005, 109, 7040-7045.*
H. Chen et al.; "A facile grafting method to synthesize novel monodispersive core-shell structure of spherical mesoporous silica@nanocrystalline zirconia"; Microporous and Mesoporous Materials 76 (2004) 209-213.
H. Y. Tian et al; "Core-shell structure of nanoscaled $Ba_{0.5}Sr_{0.5}TiO_3$ self-wrapped by MgO derived from a direct solution synthesis at room temperature"; Institute of Physics Publishing; Nanotechnology 16 (2005) 47-52.
Yu et al.; "Fabrication of Bimodal Porous Silicate with Silicalite-1 Core/Mesoporous Shell Structures and Synthesis of Nonspherical Carbon and Silica Nanocases with Hollow Core/Mesoporous Shell Structures"; Silicate Core-Shell Nanostructures; J. Phys. Chem. B, vol. 109, No. 15, 2005; pp. 7040-7045.
Search Report dated Aug. 30, 2007.

* cited by examiner

*Primary Examiner*—Leszek Kiliman
(74) *Attorney, Agent, or Firm*—Paul J. DiConza

(57) ABSTRACT

A core-shell ceramic particulate is provided. The core-shell ceramic particulate comprises a core particulate structure comprising a plurality of primary particulates and a plurality of primary pores; and a shell at least partially enclosing the core particulate structure. Each of the primary particulates comprises a plurality of secondary particulates and a plurality of secondary pores; and the shell comprises a plurality of tertiary particulates and a plurality of tertiary pores. A method of making a core-shell ceramic particulate is provided. The method comprises the steps of providing a core particulate structure comprising a plurality of primary particulates and a plurality of primary pores wherein each primary particulate comprises a plurality of secondary particulates and a plurality of secondary pores; and disposing a shell comprising a plurality of tertiary particulates and a plurality of tertiary pores onto the core particulate structure.

53 Claims, 8 Drawing Sheets

CORE-SHELL CERAMIC PARTICULATE AND METHOD OF MAKING

BACKGROUND

The invention relates generally to a core-shell ceramic particulate. More particularly, the invention relates to a core-shell ceramic particulate that is structurally and mechanically stable at high temperatures. The invention also relates to a method for making a core-shell ceramic particulate and to articles made therefrom.

Porous solids are of scientific and technological interest because of their ability to interact with atoms, ions, and molecules not only at the solid surfaces, but also throughout the bulk of the material. The increased surface area of the porous structures provides a distinct advantage for applications involving surface phenomena such as ion exchange, adsorption, sensing, and catalytic properties. Thus, porous structures have been extensively used in filtration, separation, catalysis, detection, and sensor applications. Various organic and inorganic materials have been explored in the porous structures depending on the end-use application and the working environment. There is an increased demand for materials capable of providing short response time, high selectivity, and long-term stability, especially for applications involving high temperatures and high pressures. Ceramic materials have the advantages of thermal and chemical stability, good erosion resistance, and high-pressure stability. Thus ceramic porous structures have been extensively used in many of these applications. However, devices comprising porous ceramic structures may degrade by distortion or deformation during exposure to temperature cycles that may be present in, for example, a gas separation or a sensor assembly. There is a continuous effort to improve the efficiency of porous ceramic structures suitable for high temperature operations. In spite of much effort, there remains a need for porous ceramic structures with high surface area and good structural stability.

SUMMARY OF THE INVENTION

The present invention meets these and other needs by providing a core-shell ceramic particulate, which has a hierarchical porous structure and high temperature mechanical and structural stability.

Accordingly, one aspect of the invention is to provide a core-shell ceramic particulate. The core-shell ceramic particulate comprises a core particulate structure comprising a plurality of primary particulates and a plurality of primary pores; and a shell at least partially enclosing the core particulate structure. Each of the primary particulates comprises a plurality of secondary particulates and a plurality of secondary pores; and the shell comprises a plurality of tertiary particulates and a plurality of tertiary pores.

A second aspect of the invention is to provide a method of making a core-shell ceramic particulate. The method comprises the steps of providing a core particulate structure comprising a plurality of primary particulates and a plurality of primary pores wherein each primary particulate comprises a plurality of secondary particulates and a plurality of secondary pores; and disposing a shell comprising a plurality of tertiary particulates and a plurality of tertiary pores onto the core particulate structure.

In another aspect, the embodiments of the invention provide an article. The article comprises a plurality of core-shell ceramic particulates. The core-shell ceramic particulate comprises a core particulate structure comprising a plurality of primary particulates and a plurality of primary pores; and a shell at least partially enclosing the core particulate structure. Each of the primary particulates comprises a plurality of secondary particulates and a plurality of secondary pores; and the shell comprises a plurality of tertiary particulates and a plurality of tertiary pores.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
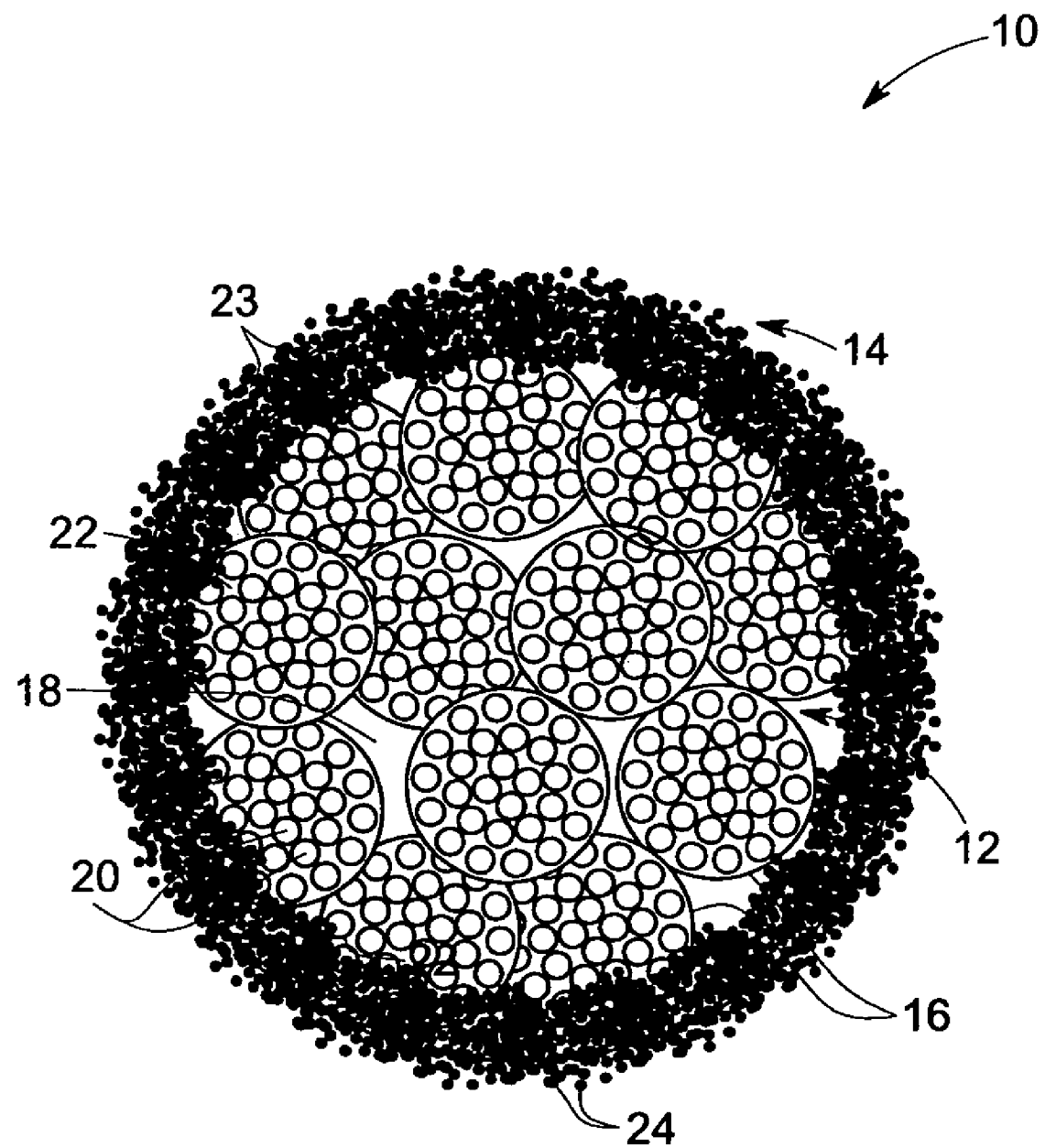
FIG. 1 is a schematic representation of a core-shell ceramic particulate according to one embodiment of the present invention.

In the following description, like reference characters designate like or corresponding parts throughout the several views shown in the figures. It is also understood that terms such as "top," "bottom," "outward," "inward," "first," "second," and the like are words of convenience and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

For the purposes of understanding the invention, the term "microporous" as that term is used herein means a structure having pore diameters of 2 nanometers or less; "mesoporous" means a structure having pore diameters of 2 nanometers to 50 nanometers, and "macroporous" means a structure having pore diameters of 50 nanometers or more. As used herein, pores are to be understood as spaces within a porous structure that are unoccupied by a solid material. For example, primary pores are empty areas between primary particulates, secondary pores are empty areas between secondary particulates, and tertiary pores are empty areas between tertiary particulates. Therefore, pore diameters and pore shapes are generally determined by the sizes and packing of particulates. In case of necked particles, pore size and shapes depend upon the necking orientation and shapes in addition to the size and packing of the particulates.

Referring to the drawings in general, it will be understood that the illustrations are for the purpose of describing one embodiment of the invention and are not intended to limit the invention thereto.

Schematic representation of a core-shell ceramic particulate according to one embodiment of the present invention is shown in FIG. 1. The core-shell ceramic particulate 10 of FIG. 1 includes a core particulate structure 12 that is at least partially enclosed by a shell 14. The core particulate structure 12 has a plurality of primary particulates 16 and a plurality of primary pores 18. Each of the primary particulates comprises a plurality of secondary particulates 20 and a plurality of secondary pores 22. The shell 14 comprises a plurality of tertiary particulates 24 and a plurality of tertiary pores 23. In certain embodiments, as discussed in further detail below, the median pore diameter of the plurality of primary particulates is different from the median pore diameter of at least one of the plurality of secondary pores and the plurality of tertiary pores. Thus the core-shell ceramic particulate of the embodiments of the invention has a hierarchical porous structure with multimodal porosity, which contributes significantly to the surface area of the porous structure.

Figure 2:
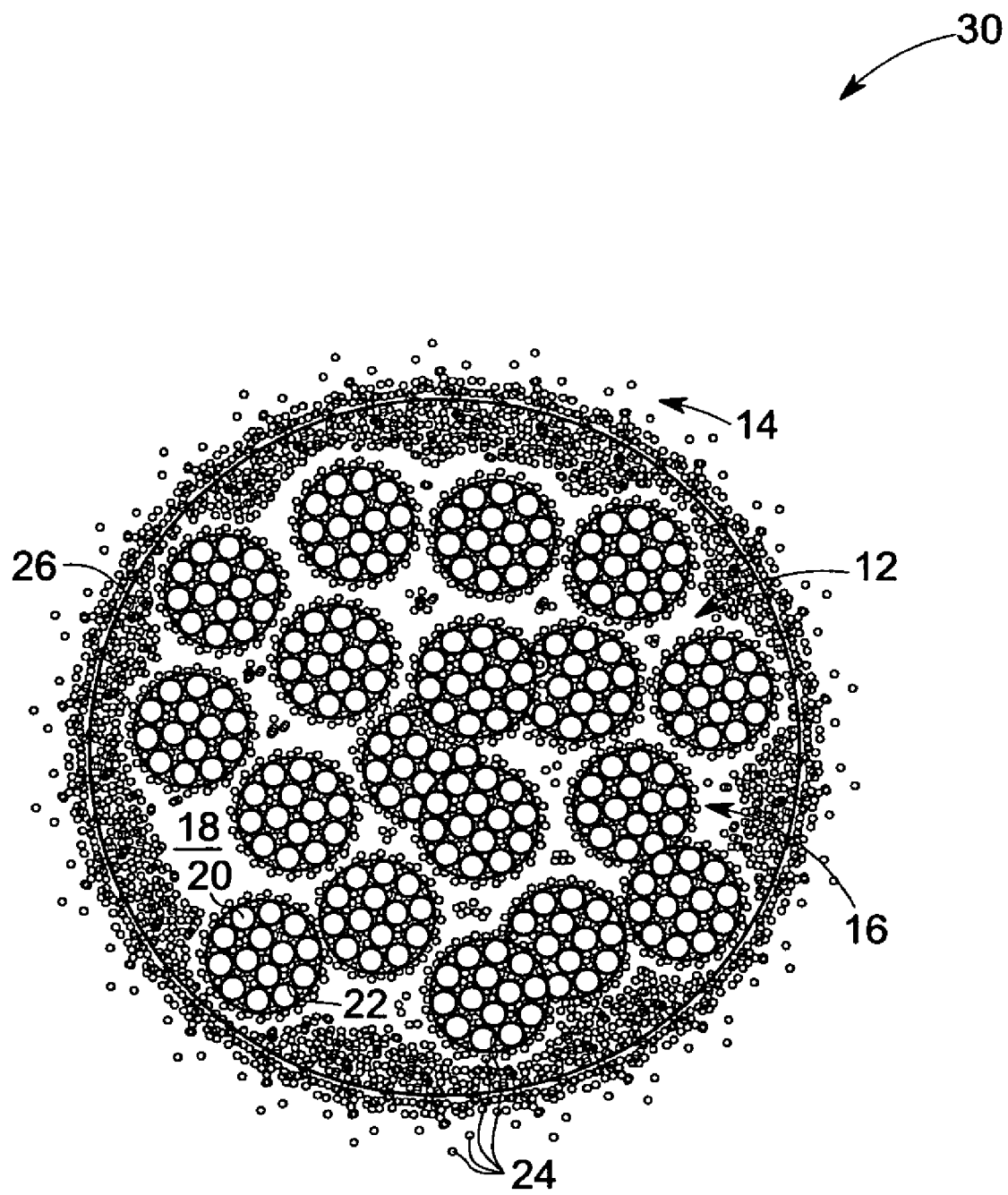
FIG. 2 is a schematic representation of a core-shell ceramic particulate, according to another embodiment of the present invention.

In certain embodiments, the tertiary particulates of the shell are also present within the core particulate structure. In one embodiment, the tertiary particulates and tertiary pores substantially enclose at least one primary particulate to form a smaller core-shell structure within the core particulate structure. The particulate is termed "substantially enclosed", when above 75% of the surface area of the particle is covered. In certain embodiments, the tertiary particulates and tertiary pores may substantially enclose many of the primary particulates. In certain other embodiments, the tertiary particulates and tertiary pores substantially enclose substantially all of the primary particulates. As used herein, "substantially all of the particulates" imply that at least about 75% of the total number of particulates. Schematic representation of such a core-shell ceramic particulate is shown in FIG. 2.

In certain embodiments, the tertiary particulates are present within the primary particulates. In one embodiment, the tertiary particulates and tertiary pores may substantially enclose at least one secondary particulate to form a still smaller core-shell structure, within the primary particulate. In certain embodiments, the tertiary particulates and tertiary pores may substantially enclose some of the secondary particulates. In other embodiments, the tertiary particulates and tertiary pores may substantially enclose substantially all of the secondary particulates. Schematic representation of such a core-shell ceramic particulate is shown in FIG. 2.

Precise control over pore size and pore size distribution are among the parameters that define the performance of the porous ceramic structure. The pore size of the primary, secondary, and the tertiary pores are chosen based on the end use application of the ceramic structure. The core-shell ceramic particulates of the embodiments of the invention have a hierarchical porous structure with multimodal porosity on the macro-, meso-, and micro-scales. The primary, secondary, and tertiary pore sizes for the particulate as a whole may be characterized by statistical measures, such as a median primary, secondary, or tertiary pore size. In certain embodiments, each of the primary, secondary, or tertiary pores may have a multimodal (such as a bimodal) pore structure, implying that the particular class of pores has two or more distinct classes of pore sizes within the population. In such embodiments, these pores may or may not be connected to the hierarchical porous structure.

Generally, the median primary pore diameter is different from the median secondary pore diameter and median secondary pore diameter is different from the median tertiary pore diameter. In certain embodiments, the median primary pore diameter is larger than the median secondary pore diameter of the plurality of secondary pores and/or the plurality of median tertiary pores diameter. In one embodiment, the median primary pore diameter is larger than the median secondary pore diameter by a factor of at least about 2. In other embodiments, the median primary pore diameter is larger than the median secondary pore diameter by a factor of at least 10. In certain embodiments, the median primary pore diameter is larger than the median secondary pore diameter but lesser than the median tertiary pore diameter. In one embodiment, the median primary pore diameter is larger than the median secondary pore diameter by a factor of at least 2, and the median tertiary pore diameter is larger than the median secondary pore diameter by a factor of at least 2. In one embodiment, the median primary pore diameter is larger than the median secondary pore diameter by a factor of at least 2, and the median tertiary pore diameter is larger than the median secondary pore diameter by a factor of at least 10. However, in certain embodiments, the median primary pore diameter is larger than the median secondary pore diameter, and the median secondary pore diameter is larger than the median tertiary pore diameter. The exact porosity and the pore diameters of the particulates depend on the porous structure required for the specific application as will be discussed in more detail in the following embodiments.

In certain embodiments, the pluralities of primary, secondary, and tertiary pores advantageously have open porous structure, implying majority of the pores open to the surface. Open pores represent fraction of the accessible pores in the porous structure, which means that these pores and pathways are interconnected and interlinked to provide a complete flow pathway throughout the material for migrating liquids or gases. However, a small fraction of the plurality of pores may have closed porous structures. An open, well-defined hierarchical porous structure with multi-modal porosity increases the active surface area and analyte diffusion improving the performance of the porous structure.

Size, packing density, and necking of the primary and the secondary particulates comprising the core particulate structure dictate the pore size and porosity of the core particulate structure. In embodiments, where the tertiary particulates are present in the core, they contribute to defining the core structure porosity. Similarly, the size, packing density and the necking of the tertiary particulates comprising the shell structure dictate the pore size and porosity of the shell. In one embodiment, the primary particulate has a median particle size in the range of from about 100 nanometers to about 1 micron. In another embodiment, the primary particulate has a median particle size in the range of from about 300 nm to about 700 nanometers. In one embodiment, the secondary particulate has a median particle size in the range from about 2 nanometers to about 50 nanometers. In another embodiment, the secondary particulate has a median particle size in the range from about 5 nanometers to about 30 nanometers. In one embodiment, the tertiary particulate has a median particle size in the range from about 5 nanometers to about 300 nanometers. In another embodiment, the tertiary particulate has a median particle size in the range from about 10 nanometers to about 100 nanometers. Each of the plurality of particulates may be substantially spherical in shape. Alternatively, other morphologies such as platelets, fibers, rods, ellipsoids, and the like are possible.

In some embodiments, the core particulate structure has porosity in a range from about 20% to about 70%. In other embodiments, the core particulate structure has porosity in a range from about 30% to about 50%. In certain embodiments, the shell has porosity in a range from about 20% to about 70%. In other embodiments, the shell has porosity in a range from about 30% to about 50%. The actual porosity of the structure is optimized to meet the requirements of the end-use application such as the flow rate and the surface area required. The achievable porosity retaining the structural integrity of the porous structure depends on the constituent materials and the method chosen for fabricating core-shell particulates.

In certain embodiments, the core particulate structure has a largest dimension in the range from about 1 micrometer to about 150 micrometers. In other embodiments, the core particulate structure has a dimension in the range from about 5 micrometers to about 50 micrometers. The shell has a thickness of at least about 5 nanometers. In certain embodiments, the shell has a thickness in the range from about 5 nanometers to about 500 nanometers. The shell may have a single layer or may have multiple layers of same or different materials.

The material of the core (termed core-material herein) and the shell (termed shell-material herein) are chosen based on the end use application. The material of the shell and the core are chosen such that they are mechanically and structurally stable at the operation temperature of the device and provide the necessary structural integrity. The core comprises any ceramic material including an oxide, a nitride, a carbide, a boride, or a chalcogenide. In certain embodiments, the core particulate structure comprises more than one ceramic. In certain embodiments, the core particulate structure comprises a ceramic composite. Examples of suitable ceramics include, but are not limited to, zirconia, stabilized-zirconia, yttria-stabilized zirconia, alumina, titania, ceria, doped ceria, samaria-doped ceria, gadolinia-doped ceria, silica, yttria, zinc oxide, tin oxide, and magnesium oxide. In certain embodiments, the core comprises a magnetic material such as iron-oxide containing particulates, magneto-optical material, or a ferroelectric material. In an exemplary embodiment, the oxide comprises yttria-stabilized zirconia. As a structural material, the yttria-stabilized zirconia has no phase changes from room temperature up to about 2500° C. and is attractive for high temperature operation. Stabilized zirconia and titania, are stable in aqueous solutions which make them suitable materials for liquid separations. Zirconia and doped ceria have high ionic conductivity at high temperature, which makes them suitable core materials for ionically conductive electrodes for sensors and fuel cells.

Similarly, the shell may comprise any ceramic material, such as, for example, an oxide, a nitride, a carbide, a boride, or a chalcogenide. Typically, the shell material has at least one physical property, such as, for example, electrical conductivity, ionic conductivity, thermal expansion, or the like, that is sensitive to certain environmental conditions, and hence the core-shell particulate can be used as a sensor material. For example, ferrites have electrical conductivity that is sensitive to oxygen partial pressure and can be used as oxygen-sensor materials. Examples of suitable shell-materials include, but are not limited to, ferrites, cuprates, ruthenates, chromates, cobaltates, nickelates, phosphates, titanates, manganates, and silicates. In an exemplary embodiment, the shell comprises lanthanum ferrite. These shell-materials may have certain dopants introduced in order to optimize their sensing properties. Examples of such dopants include, but are not limited to, an alkaline element, an alkaline-earth element, a rare-earth element, a transition metal element, or combinations thereof. In the case of a semiconducting oxide gas sensor, exemplary shell materials include tin dioxide, titania, barium titanate, tungsten oxide, or barium stannate. In the case of an electrochemical gas sensor, exemplary shell materials include perovskite oxides, for example ferrites, cobaltites, manganates, ruthenates, chromates, and nickelates.

In certain embodiments, the shell material comprises a catalytic material. For example, by utilizing a catalytic material, it is possible to combine fluid separation with catalytic reaction to achieve high efficiency fluid mixture separation. The catalyzed reaction may be used to reduce the concentration of one or more of the reaction products and hence increasing the conversion efficiency. Catalytic materials may also be included for microreactor, getter, electrode, or sensor applications. Some examples of suitable catalyst materials include, but are not limited to, transition metals and their oxides, copper oxide, ceria, titania, perovskites, zinc oxide, manganese oxide, tungsten oxide, tin oxide, alumina, or combinations thereof. One skilled in the art would know how to choose a catalyst material based on the desired reaction and given working environment. The shell may comprise multiple layers containing same or different materials to achieve unique sensing properties.

In one embodiment, the ceramic core-shell particulate is thermally stable—i.e., it does not undergo any decomposition or melting—up to about 1000° C. The ceramic composite is also structurally stable up to about 1000° C.; i.e., neither the ceramic core nor the ceramic shell undergo a substantial change in crystal structure or morphology at or below this temperature.

In one embodiment, an article comprising a plurality of core-shell ceramic particulates of the embodiments of the invention is provided. Candidate materials and characteristic sizes of particulates have been previously described hereinabove. The ceramic core-shell particulates of the present invention may be formed into a near net shape, such as, but not limited to, flat, hemispherical, dome, cone, and other complex shapes. Such a compact structure may be used as a porous ceramic membrane. Any of the known techniques may be used for obtaining a near net shape including compacting and sintering, self-assembly with or without functionalization of the particles, or slip casting, gel casting, or other near-net shape forming techniques. Alternatively, the ceramic core-shell particulates may be in the form of a coating deposited on a surface of a substrate. Any coating technique known in the art may be used for obtaining the coating, including plasma spraying, dipping, electrophoretic deposition, or the like. Core-shell ceramic particulates of the embodiments of the invention retains their structural integrity and are less prone to the grain growth phenomena that are prevalent in sintered particles on subjecting to high temperatures that may be needed for the processing. Not wishing to be limited by theory, it is proposed that the shell material enclosing the core particulates prevents undesirable grain growth of both core and shell structures when subjected to high temperature processes.

The core-shell ceramic particulates of the embodiments of the invention may be used for making a membrane structure. Many of the ceramic membrane structures comprise a plurality of ceramic layers with different porosity, pore structures, and functionalities to achieve desired functionalities required for a specific application. For example, asymmetric membranes have a plurality of layers differing in pore sizes and porosity. Catalyst layers may be inserted into the layered structure and/or some of the layers may be coated with a catalyst material. Fabrication of core-shell particulates facilitates achieving different functionalities within a single particulate by choosing an appropriate core and shell structure combination. In such embodiments, the shell-material may comprise a catalyst. Core-shell particles with multi-shell structures enable multiple functionalities. For example, the shell may comprise a layer of chromium titanium oxide, which is a sensor material capable of detecting reducing gases such as carbon monoxide, hydrocarbons, ammonia, hydrogen sulphide, and sulphur dioxide; and a layer of tungsten oxide capable of detecting oxidizing gases such as ozone, nitrogen dioxide, and chlorine, to obtain a dual sensor.

The core-shell ceramic particulate of the invention may be useful in a number of applications. In some embodiments, the core-shell ceramic particulate is part of a separation assembly. The core-shell ceramic particulate may be made in the form of a porous ceramic membrane structure as described above, and the membrane may be utilized in the air separation assembly. The ceramic membrane in certain embodiments of the invention may be capable of molecular sieving suitable for purification of sub quality natural gas, air separation, $NO_x$ separation, oxygen separation, or hydrogen recovery from processing gases or feedstock. In one embodiment, the ceramic membrane structure of the invention may be used for separation of hydrogen from nitrogen, argon, carbon dioxide, or methane. In another embodiment, the ceramic membrane structure of the invention may be used for separation of volatile organic components from air streams. In some embodiments the ceramic structure is a part of a high temperature gas separation unit. For such applications, a suitable metal or a composite coating may be applied on one or more layers of the ceramic structure. Alternatively, a metal or a composite layer may be used in conjunction with the ceramic structure.

Figure 3:
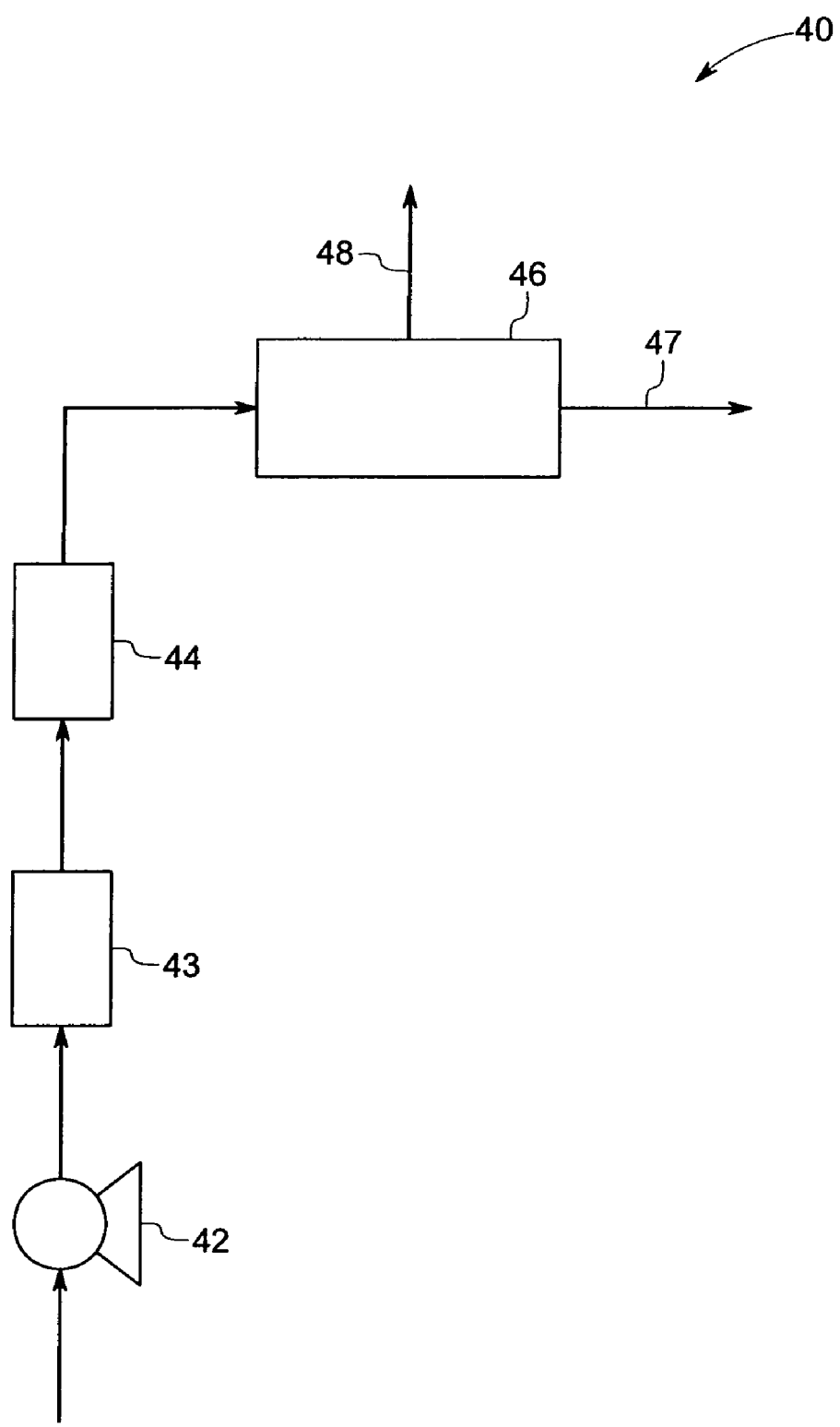
FIG. 3 is a schematic representation of a gas separation assembly incorporating core-shell ceramic particulate of the invention, according to one embodiment of the invention.

FIG. 3 shows a schematic representation of a simple gas separation unit 40 according to one embodiment of the invention. The unit 40 includes a compressor 42, a coalescing filter 43 and a pre-heater unit 44 connected to a membrane separation unit 46. Air under pressure flows first through the coalescing filter 43 and then through the pre-heater unit 44 before reaching the membrane separation unit 46. The coalescing filter may be used to remove oil or water droplets or particulate solids from the feed. The membrane separation unit includes one or more of membrane structure of the invention configured to remove a desired component from the air mixture. The desired component passes through outlet 47, leaving the waste permeate gases through outlet 48. The membrane separation unit may include additional heaters or additional filters.

The membrane structure may be used as a liquid-liquid separation assembly such as separation of water from fluid containing organic components. For such applications, the membrane structure may be combined with other porous or non-porous separation layers if needed. In one embodiment, a separation layer of non-porous cross-linked polyvinyl alcohol layer of suitable thickness is used in conjunction with the membrane structure. The pore structure and thickness of each of the layers may be adjusted depending on the requirement. In some embodiments, the membrane structure may be a membrane structure in a separation assembly that also includes a reactor component coated on the pore walls to prevent fouling.

In one embodiment, the membrane structure comprising the core-shell ceramic particulate is part of a filtration assembly. By controlling the pore dimensions of the layers, the membrane structure of the invention may be used for microfiltration to filter out solid particles with dimensions less than about 10 micrometers, or for ultrafiltration to filter out particles with dimensions down to about 50 nanometers, such as macromolecules and bacteria. By choosing the pore dimensions of the layers in very small sizes, it is possible to use these membrane structures for hyperfiltration to filter out still smaller units such as sugars, monomers, aminoacids, or dissolved ions by reverse osmosis. In one embodiment, the membrane structure is a part of a bio-separation or reaction assembly. The pore size and thickness of the membrane layers are chosen depending on the sizes of the species to be separated. Accordingly in one embodiment, the membrane structure is a filter usable in food, pharmaceutical, and industrial applications. In another embodiment, the membrane structure is a part of a protein purification unit.

Figure 4:
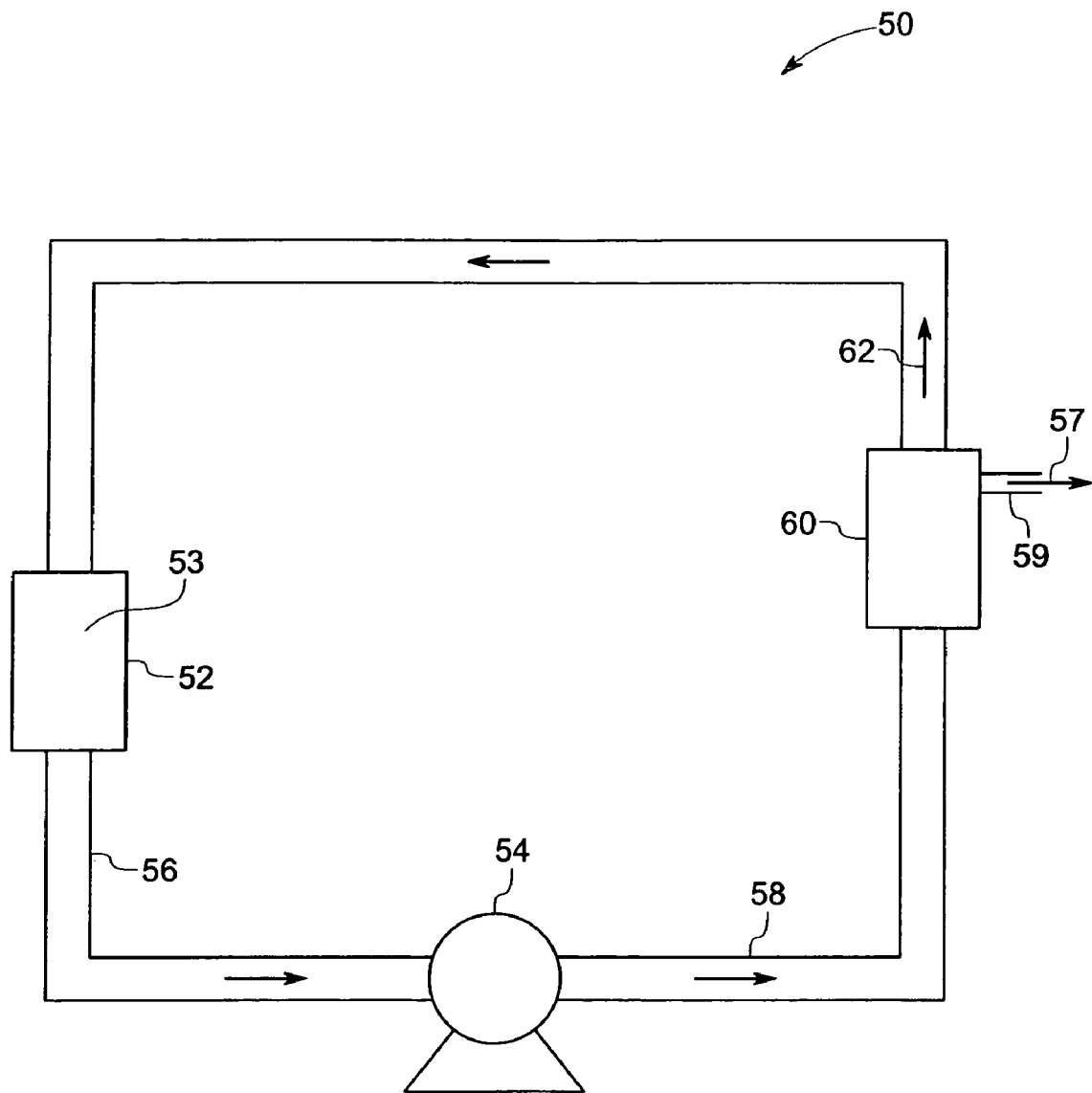
FIG. 4 is a schematic representation of a filter incorporating core-shell ceramic particulate of the invention, according to one embodiment of the invention.

FIG. 4 shows a schematic representation of a simple filter unit 50 according to one embodiment of the invention. The unit 50 includes a feed tank 52 used for storing the liquid medium containing the material to be separated. The circulation of the feed 53 is controlled by the pump 54 that draws the feed 53 through lines 56 and 58 into a membrane filter assembly 60. The membrane filter assembly 60 includes one or more of the membrane structure of the invention configured to filter out a specific component from the feed. The desired component 'filtrate' 57 passes through outlet 59, while the retentate 62 may be removed or returned to the feed tank 52.

In many applications involving porous membrane structures such as filtration or separation applications, the general problem is that the flow rate (termed "permeance") is strongly dependent on the pore size of the membrane structure. Rapid mass transport can be achieved by increasing the pore size, however, with increase in pore size, the selectivity or the reactivity of the membrane decreases. Hence, generally a trade-off must be made between the mass transport and the selectivity properties. One way to increase the mass transport is to exploit the hierarchical porous structure of embodiments of the present invention, where large feeder pores from the particle surface open into a network of smaller pores with a large surface area available for adsorption or vice versa.

In one embodiment, the core-shell ceramic particulate is part of a sensor assembly. In such embodiments, the core and the shell layers may comprise materials that are capable of performing reversible changes or the core and/or the shell layer may be functionalized with functional groups as discussed above, to incorporate within the ceramic structure. Examples of reversible changes include, but not limited to, chemical reactions such as ionization, oxidation, reduction, hydrogen bonding, metal complexation, isomerization, and covalent bonding. These changes may be utilized to detect a chemical or a biological species, or to detect change in temperature, pH, ionic strength, electrical potential, light intensity, or light wavelength. The use of ceramic structures for sensor applications is expected to enhance the performance of detection because of their high surface to volume ratio.

In an exemplary embodiment, the core-shell ceramic particulates are used to fabricate a high temperature gas sensor. In such embodiments, the shell/core structure may comprise a material, which upon exposure to a gaseous chemical compound or mixture of chemical compounds alters one or more of its physical properties (e.g. mass, electrical conductivity, or capacitance) in a way that can be measured and quantified directly or indirectly. A host of gas sensing materials is known in the art and any suitable material may be chosen depending on the requirement and the working environment. Short response time, good response signal, easy manufacturability, low cost, high selectivity, and long-term stability are some of the criteria among other known parameters used in selecting the material. For example, semiconducting oxides such as zinc oxide, tin oxide, tungsten dioxide, manganese oxide, and other transition metal oxides are suitable for high temperature gas sensing applications. The gas sensing mechanism involves chemisorption of oxygen on the surface of these oxides followed by charge transfer during the reaction of oxygen with the target gas molecule, which will change the resistance change on the surface of the sensor. The high surface area of the core-shell structure of the embodiments of the invention offers distinct advantages for gas-sensing applications. The structural and mechanical stability of the core and the shell structures provide additional benefits.

In one embodiment, the article is a part of a getter assembly. Getters are extensively used in air purification in semiconductor processing, in vacuum systems, optical and for space applications. A physical getter physically absorbs and holds water vapor, particulates, or contaminants from a mixture. A chemical getter on the other hand removes a particular component from a mixture via a chemical reaction. Various ceramic materials are known to have affinity for specific gas molecules and hence can be used for gettering that particular gas molecule. For example sorbents that are effective for $H_2S$ include, but are not limited to, zinc oxide, iron oxide, zinc ferrite, lanthanum ferrite, and lanthanum cuprate. Sorbents that are effective for $CO_2$ include, but are not limited to, calcium carbonate, lithium silicate, and lithium zirconate.

Figure 5:
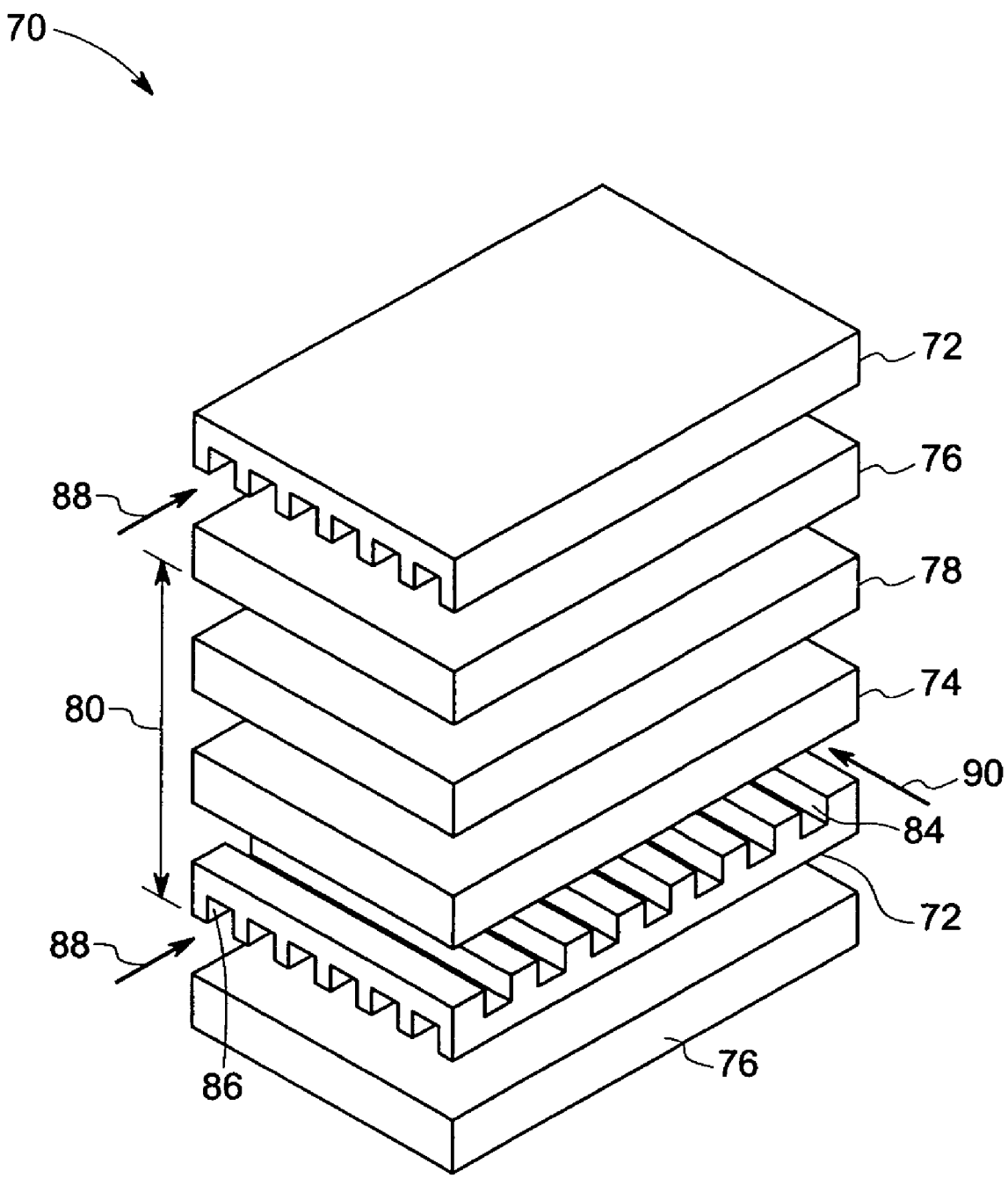
FIG. 5 is a schematic representation of a fuel-cell incorporating core-shell ceramic particulate of the invention, according to one embodiment of the invention.

The core-shell ceramic particulates of the embodiments of the invention may be used in fabricating a cathode or an anode of a solid state fuel cell. A fuel cell, for example a Solid Oxide Fuel Cell (SOFC), is an energy conversion device that produces electricity by electrochemically combining a fuel and an oxidant across an ionic conducting layer. An exemplary planar fuel cell 70 comprises an interconnect portion 72, a pair of electrodes, a cathode 74 and an anode 76, separated by an electrolyte 78, as shown in FIG. 5.

The interconnect portion 72 defines a plurality of airflow channels 84 in intimate contact with the cathode 74 and a plurality of fuel flow channels 86 in intimate contact with the anode 76 of an adjacent cell repeat unit 80, or vice versa. In operation, a fuel flow 88 is supplied to the fuel flow channels 86 and an airflow 90, typically heated air, is supplied to the airflow channels 84.

Figure 6:
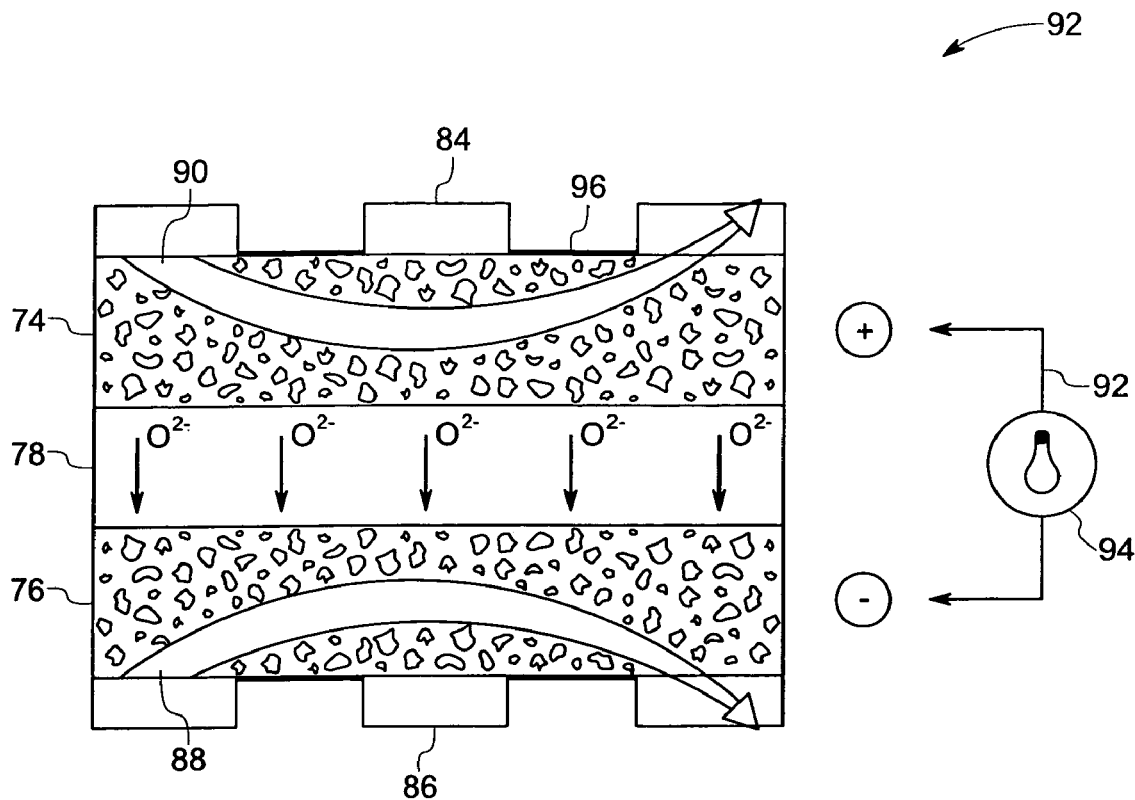
FIG. 6 illustrates an enlarged portion of an exemplary fuel cell assembly showing the operation of the fuel cell.

FIG. 6 shows a portion of the fuel cell illustrating the operation of the fuel cell. As shown in FIG. 6, the fuel flow 88, for example natural gas, is fed to the anode 76 and undergoes an oxidation reaction. The fuel at the anode reacts with oxygen ions ($O^{2-}$) transported to the anode across the electrolyte. The oxygen ions ($O^{2-}$) are de-ionized to release electrons to an external electric circuit 94. The airflow 90 is fed to the cathode 74 and accepts electrons from the external electric circuit 94 and undergoes a reduction reaction. The electrolyte 78 conducts ions between the anode 76 and the cathode 74. The electron flow produces direct current electricity and the process produces certain exhaust gases and heat.

The main purpose of the anode layer 76 is to provide reaction sites for the electrochemical oxidation of a fuel introduced into the fuel cell. In addition, the anode material should be stable in the fuel-reducing environment, have adequate electronic conductivity, surface area and catalytic activity for the fuel gas reaction at the fuel cell operating conditions and have sufficient porosity to allow gas transport to the reaction sites. The main purpose of the electrolyte layer is to conduct ions between the anode layer 76 and the cathode layer 74. The electrolyte carries ions produced at one electrode to the other electrode to balance the charge from the electron flow and complete the electrical circuit in the fuel cell. Additionally, the electrolyte separates the fuel from the oxidant in the fuel cell. Accordingly, the electrolyte must be stable in both the reducing and oxidizing environments, impermeable to the reacting gases and adequately conductive at the operating conditions. Typically, the electrolyte 78 is substantially electronically insulating. The cathode layer 74 is disposed upon the electrolyte 78. The main purpose of the cathode layer 74 is to provide reaction sites for the electrochemical reduction of the oxidant. Accordingly, the cathode layer 74 must be stable in the oxidizing environment, have sufficient electronic and ionic conductivity, surface area and catalytic activity for the oxidant gas reaction at the fuel cell operating conditions and have sufficient porosity to allow gas transport to the reaction sites.

As discussed above, the criteria generally used in selecting a material for the cathode/anode of a solid state fuel cell are catalytic activity, ionic conductivity, thermal coefficient of expansion, electronic conductivity and stability. It is difficult to achieve all of the above properties in a single material. Thus synthesis of core-shell ceramic particulates facilitates combining two or more materials and hence promises to meet many of the above criteria. For example, a core-shell ceramic particulate comprising a YSZ core and a lanthanum strontium ferrite as a shell is an attractive combination. The higher surface area and the highly interconnected three-dimensional porosity of the core-shell particulate enhance the catalytic activity of the fuel cell. In such embodiments, the shell material may be a catalyst suitable for the desired reaction. The uniform dispersion of the catalyst shell material throughout the porous core-shell structure, including coverage around the primary and/or secondary particulates enhances the catalytic activity enormously. In such embodiments, the core and the shell may comprise an appropriate porous structure. For example, the shell may comprise a mesoporous structure open to the outer surface and the core may comprise a macroporous core providing an open highway network around the active catalyst for a facile diffusion of fuels and products into and out of the structure. In one embodiment, the fuel cell is a methanol fuel cell. The methanol fuel cell may be used in the production of hydrogen.

Figure 7:
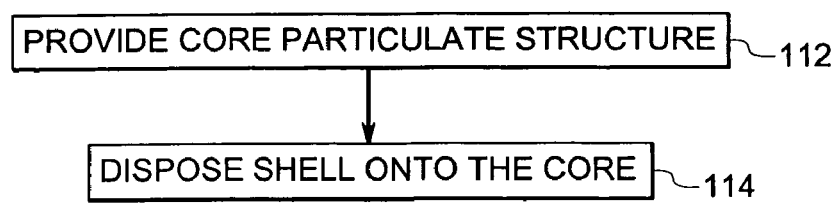
FIG. 7 is a flow chart of a method of making core-shell ceramic particulate, according to one embodiment of invention.

Another aspect of the invention is to provide a method of making a core-shell ceramic particulate. FIG. 7 shows a flow chart of a method 110 for making a core-shell ceramic particulate according to an embodiment of the invention. The method comprises the steps of: providing a core comprising a plurality of primary particulates and a plurality of primary pores in step 112; and disposing a shell comprising a plurality of tertiary particulates and a plurality of tertiary pores onto the core in step 114.

Typically fabrication of porous structures with controlled hierarchical porosity involves many complicated chemical processes such as microemulsion or sol gel synthesis. On the contrary, the method of the embodiments of the invention provides a very simple and a versatile method for the fabrication of core-shell particulates. Certain surfactants or fluxes may be used to obtain specific porosity and pore structures, the details of which are discussed below. The pore sizes and porosity may be tuned by controlling the size of the nano-sized particulates, size-distribution, and sintering conditions.

In certain embodiments, the core particulate is optionally heated in a selected flux material to stabilize the porous core particulate structure. Suitable materials for the flux include, but are not limited to, a fluoride, a borate, a nitrate, a chloride, an oxide, an iodide, an alkali carbonate, an alkaline-earth carbonate, and combinations thereof. In an exemplary embodiment, the flux comprises lithium tetra borate and lithium fluoride. In another exemplary embodiment, the flux comprises lithium tetra borate and sodium nitrate. These fluxes are considered based on their low melting points and hence their ability to bind and get the core porous structures at relatively lower temperatures. The process may further comprise heating the core particulate structures in the flux at a temperature ranging from about 600° C. to about 1200° C. Typically the core particulates are heated for about 0.5 hours to about 3 hours till the flux uniformly coats the core particulate structures and stabilizes the structures.

In certain embodiments, the dispersion comprising the core particulate and the surfactant is heated to a sufficient temperature to a sufficient duration of time to obtain a chemically stable protective coating, which can protect the particulate from the reacting media during processing. Any of a number of commercially available surfactants is suitable for use in embodiments of the present invention. The surfactant comprises at least one surfactant selected from the group consisting of cationic surfactants, anionic surfactants, non-ionic particulate and combinations thereof; wherein the non-ionic surfactants are selected from the group consisting of polar surfactants, non-polar surfactants, and combinations thereof.

Figure 8:
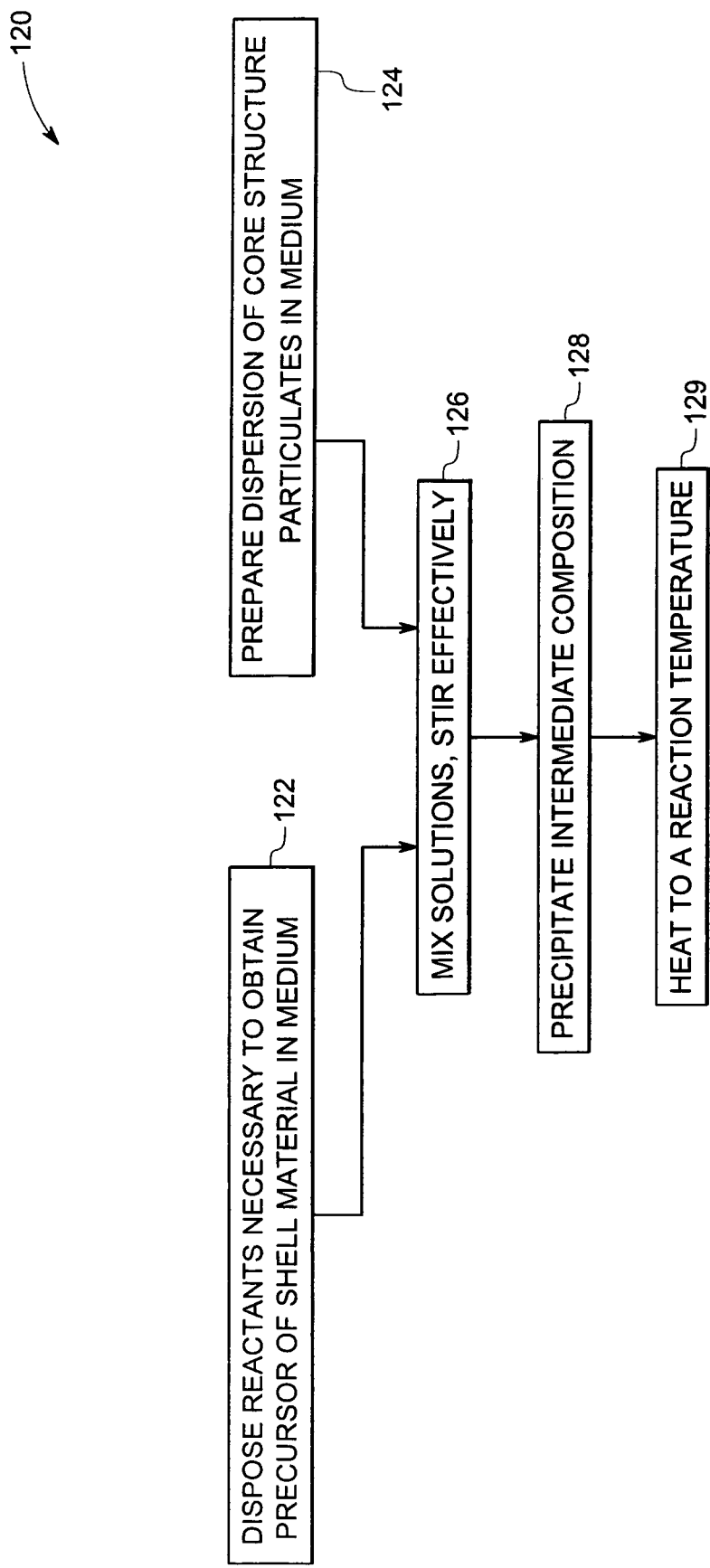
FIG. 8 is a flow chart of a method of making core-shell ceramic particulate by an in-situ process, according to one embodiment of invention.
Figure 9:
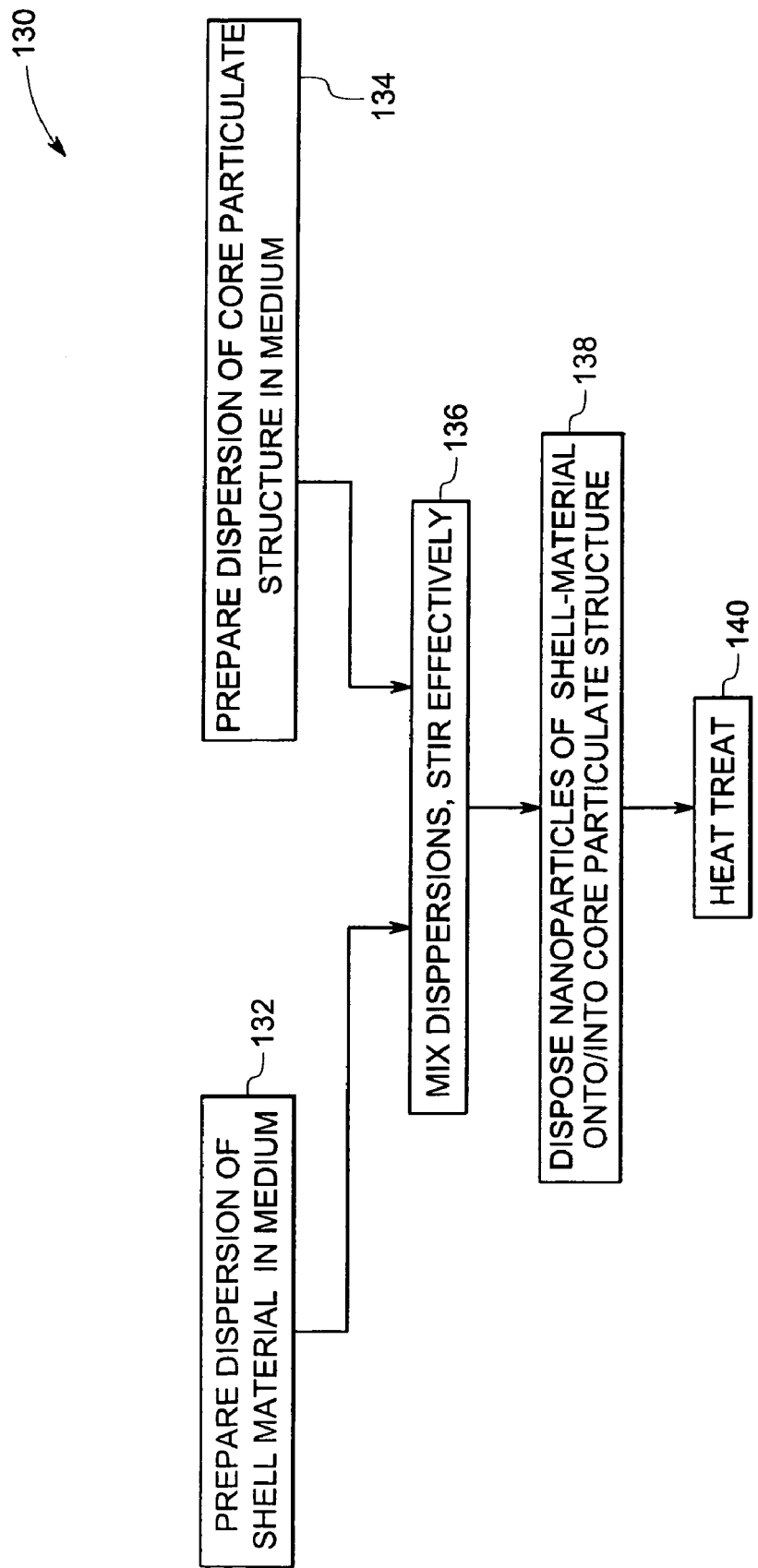
FIG. 9 is a flow chart of a method of making core-shell ceramic particulate by an ex-situ process, according to another embodiment of invention.

The shell may be provided and disposed onto/into the core particulate structure in-situ or ex-situ. The process is termed in-situ when the shell-material is produced during the coating process. A flow chart illustrating an in-situ process (method 120) is depicted in FIG. 8. The process is termed ex-situ when the shell-material is made in a separate process and then disposed onto the core particulate structure during the process of the present invention. FIG. 9 illustrates the ex-situ process (method 130) of preparing the particulate composition.

The size and shape of the particulates may vary including the size ranges and morphologies specified in the composition embodiments. Particulates used may be prepared by any synthesis method known in the art. Generally, particulates are provided dispersed in a liquid medium. Any suitable liquid medium may be used. In some embodiments, the liquid medium includes water. In certain other embodiments, the liquid medium is an organic solvent. In certain embodiments, the amount of shell-material is in the range from about 2 weight percent to about 30 weight percent, and in particular embodiments this amount is in the range from about 5 weight percent to about 25 weight percent.

When the shell structure is provided in-situ, generally in step 122, the reactants necessary to obtain the shell structure are provided. Generally, precursors of the constituents of the shell-material is disposed in a medium to form a solution, a gel, a suspension, a colloid, or a dispersion. Non-limiting examples of precursors include nitrates, chlorides, alkoxides, acetates and oxides. The medium preferably has a low viscosity to facilitate flow and adequate mixing. In step 122, a dispersion of core structure particulates in a suitable media is provided. In step 126, the dispersion of core particulate structure and the solution comprising the shell material precursor are mixed to dispose the shell particulates onto the core. When the process is in-situ, an intermediate composition of the shell structure is precipitated either by simple heat treatment, or by raising the pH of the above mixture by adding a basic component, or by adding a fuel to the mixture in step 128. Any suitable base may be used. Non-limiting examples of suitable basic components are sodium hydroxide, tetra methyl ammonium hydroxide, ammonium carbonate and ammonium hydroxide. In embodiments where a fuel is used, any fuel used in combustion synthesis such as glycene may be used. The intermediate composition of the shell structure is converted into the desired shell structure phase by heating to a reaction temperature, in step 129. The heating temperature may vary and depends on the composition of the particulate. For example, certain oxide particulate compositions may require higher temperatures to form the desired phase than the phosphate particulate compositions. One skilled in the art would know to choose an appropriate temperature and heating durations.

When the method is in-situ, nanoparticles of the shell structure can be prepared by different processes, Nanoparticles of inorganic materials, such as the shell structures herein disclosed, may be prepared by a number of methods. One method of preparation is flame spray pyrolysis of a solution of the precursors of the inorganic material. Such a method is described, for example, in U.S. Pat. No. 5,958,361, which is incorporated herein in its entirety by reference. In this method, an organometallic compound that comprises the desired metals and other heteroatoms in appropriate ratios (to achieve the final chemical composition of the particulate) is dissolved in a combustible solvent, in which the organometallic compound is soluble, to form a solution. The solution is then aerosolized into a flame spray pyrolysis reactor in the presence of excess oxygen. The volatile solvent is burned, and the precursors decomposed to produce an inorganic vapor in the correct chemical composition of the final particulate. The inorganic vapor condenses rapidly in a steep temperature gradient to form nanometer-sized particles of the particulate. A variation of this technique is found in R. Baranwal et al., "Flame Spray Pyrolysis of Precursors as a Route to Nano-mullite Powder: Powder Characterization and Sintering Behavior," J. Am. Ceram. Soc., Vol. 84, No. 5, pp. 951-61 (2001).

Another method for the preparation of the nanometer-sized particles of inorganic materials is based on the sol-gel method. A representative description of this method is disclosed in R. Subramanian et al., "Synthesis of Nanocrystalline Yttria by Sol-Gel Method," Materials Letters, Vol. 48, pp. 342-346 (May 2001). Nanocrystalline inorganic materials are produced by precipitation by a hydroxide, such as ammonium hydroxide, from a soluble precursor mixture containing all of the desired elements. In an exemplary embodiment, particle sizes in the range from about 20 to 40 nm are produced by this method.

Another method for the preparation of the nanometer-sized particles of inorganic materials is based on the colloidal method. Representative descriptions of this method and one of its variations are disclosed in R. Ramesh et al., "Optical Properties of $Ce^{3+}$ in Self-Assembled Strontium Chloro(hydroxy)apatite Nanocrystals," J. Phys. Chem. B, Vol. 104, pp. 8351-8360 (2000); T. S. Ahmadi et al., "Low-Temperature Synthesis of Pure and Mn-Doped Willemite Particulate ($Zn_2SiO_4$:Mn) in Aqueous Medium," Materials Research Bulletin, Vol. 35, pp. 1869-1879 (2000); and C. Feldmann et al., "Preparation of Sub-Micrometer $LnPO_4$ Particles (Ln=La, Ce)," J. of Materials Science, Vol. 37, pp. 3251-3254 (2002). A mixture comprising reactants is stirred at high speed at an elevated temperature, and the cooled rapidly to produce nanometer-sized colloidal particles. It is expected that the resulting particle size varies inversely with respect to stirring speed and cooling rate. Particles sizes from about 10 nm to several thousand nanometers may be obtained.

When the process is ex-situ, the shell material is disposed onto the core particulate structure either by a dry or a wet chemical means. The shell material may be disposed either by mechanical or by chemical means. Mechanical means imply any mechanical milling process with or without a solvent. In certain embodiments, the core particulate structure and the shell material are mechanically milled to coat the core particulate structure with the shell material. The core-shell particulates thus obtained are heated at a high temperature to obtain a stable core-shell structure.

An ex-situ chemical process 130 is depicted as a flow chart in FIG. 9. In an ex-situ process, in accordance with one embodiment of the present invention, a dispersion of shell-material is formed in a liquid medium, in step 132, and another dispersion of the core particulate structure is formed in a liquid medium in step 132. In some embodiments, the liquid medium comprises water. In an exemplary embodiment of the present invention, disposing the shell structure onto the core particulate structure includes mixing the dispersion of the core particulate structure and the dispersion of the shell structure with a surfactant in step 136 and stirring of the mixture. In an ex-situ process, a plurality of nanoparticles of the shell structure having an average primary crystallite size of less than about 100 nm are precipitated onto the core particulate structure, in step 138. If needed, any excess organic material is removed by heating, in step 140. Heating temperature may vary depending on the organic residue present. Typically heating temperature ranges from about 100° C. to about 1000° C. In one embodiment, it is from 200° C. to about 800° C. and in another embodiment the heating temperature ranges from about 400° C. to about 600° C. In embodiments where a flux is used for the stabilization of core particulate structures, after the flux treatment, the flux may be removed by any known process in the art. For example water dissolvable fluxes are removed by repeated washing in water.

The embodiments of the present invention are fundamentally different from those conventionally known in the art. There have been reports of core-shell ceramic particulates. For example, coating of mesoporous silica/alumina with a shell material is known. Most of the disclosed core-shell particulates are not characterized by the hierarchical porous structure as disclosed herein. Moreover, most of these core-shell particulates are not suitable for high temperature applications. Moreover, typically, core-shell ceramic particulates are obtained by reverse micelle microemulsion technique or colloidal templating using sacrificial templates followed by selective removal of the sacrificial template. The embodiments of the invention provide simpler and a versatile method to obtain core-shell ceramic particulate with controlled pore sizes and porosity.

The following example serves to illustrate the features and advantages offered by the present invention, and not intended to limit the invention thereto.

EXAMPLE

Example 1

In-situ Wet Method for Preparing Yttria Stabilized Zirconia-lanthanum Ferrite Core-shell Particulates Desired amount of yttria stabilized zirconia (YSZ) powder from TOSOH, Japan with the identification TZ-8Y was taken and heat-treated for 1000° C. for 2 hours to make them structurally integral and mechanically strong. The structural integrity of the particulates is verified by taking a small amount of these powders in an aqueous or a non-aqueous (ethanol or isopropanol) medium, ultrasonicating for 5 minutes and then looking for the settlement of the particles. If the powders settle down in the bottom without dispersing much in the solvent medium, then the powder is considered to be having good mechanical strength and structural integrity. These dispersed and settled powders were observed in the optical microscope to inspect them for any broken particles. The powders with more than 95% spherical balls are considered to be good for coating. Stoichiometric amounts of Lanthanum nitrate and Iron nitrate were dissolved in deionized water in 1:1 molar ratio in a conical flask. To the above solution, heat-treated yttria stabilized zirconia powder YSZ was added in the weight ratio of 4:1 and mixed well. An organic fuel, Glycene ($CH_2NH_2COOH$), was added and dissolved in the above solution with the nitrates:fuel ratio of 2:1. The above-formed mixture was kept for heating on a table-top heating mantle inside a fume hood. Glycene, the fuel for combustion, facilitates the precipitation of $LaFeO_3$ powder on and into the YSZ particulates on heating. The contents of the conical flask were transferred to an agate pestle and mortar and mixed well. These samples were calcined at a temperature of 600-1000° C. for about 2-6 hours and characterized by X-ray powder diffraction (XRD), scanning electron microscopy (SEM), energy dispersive X-ray analysis (EDS), transmission electron microscopy (TEM) and surface area analyzer (BET) for the coating coverage, phase size and surface area analysis. The x-ray diffraction pattern of the lanthanum ferrite coated YSZ particles were compared with the XRD patterns of lanthanum ferrite and YSZ. The x-ray diffraction pattern (not shown) of the lanthanum ferrite coated YSZ particles shows the peaks corresponding to both lanthanum ferrite and YSZ, indicating the presence of both these components in the core-shell particulates. Uniform coverage of shell particulates over the core particulates was confirmed by microscopy and elemental analysis. The energy dispersive X-ray patterns taken at different parts of the core-shell particle (not shown) indicated that pattern taken at the edge of the particle predominantly shows peaks corresponding to lanthanum and iron, the pattern taken at the interior of the particle shows peaks of yttrium and zirconium and pattern taken at the middle shows peaks corresponding to all of the above components confirming the formation of a coating of lanthanum ferrite on the YSZ particles.

Example 2

Ex-situ Wet Method for Preparing Yttria Stabilized Zirconia-lanthanum Ferrite Core-shell Particulates 4.5 grams of high purity yttria stabilized zirconia, was dispersed in 5-10 ml deionized water and transferred into a 30 milliliters PP bottle. To the above dispersion, 0.5 grams of nanocrystalline $LaFeO_3$ was added and mixed well using a magnetic stirrer. The bottle was then placed on a rack mill for about 24 hours, dried the slurry in an oven at around 110° C. for about 2 hours and the powder was then subjected to heat treatment at about 800° C. in a muffle furnace for about 2 hours. The core shell powder thus obtained was then subjected to various analytical techniques such as XRD, SEM, EDS, TEM and BET surface area analysis. The x-ray diffraction pattern of the lanthanum ferrite coated YSZ particles were compared with the XRD patterns of lanthanum ferrite and YSZ. The x-ray diffraction pattern (not shown) of the lanthanum ferrite coated YSZ particles shows the peaks corresponding to both lanthanum ferrite and YSZ, indicating the presence of both these components in the core-shell particulates. Uniform coverage of shell particulates over the core particulates was confirmed by microscopy and elemental analysis. The energy dispersive X-ray patterns taken at different parts of the core-shell particle (not shown) indicated that pattern taken at the edge of the particle predominantly shows peaks corresponding to lanthanum and iron, the pattern taken at the interior of the particle shows peaks of yttrium and zirconium and pattern taken at the middle shows peaks corresponding to all of the above components confirming the formation of a coating of lanthanum ferrite on the YSZ particles.

Example 3

Ex-situ Dry Method for Preparing Yttria Stabilized Zirconia-lanthanum Ferrite Core-shell Particulates 4.5 grams of high purity yttria stabilized zirconia (core material) was taken in a 30 ml capacity PP (poly propylene) bottle. To the above powder, 0.5 grams of nanocrystalline $LaFeO_3$ was added and mixed well by shaking. The bottle was then placed on a rack mill for about 24 hours and the powder was then subjected to heat treatment at about 800° C. in a muffle furnace for about 2 hours. The core shell powder thus obtained was then subjected to various analytical techniques such as XRD, SEM, EDS, TEM and BET. The x-ray diffraction pattern of the lanthanum ferrite coated YSZ particles were compared with the XRD patterns of lanthanum ferrite and YSZ. The x-ray diffraction pattern (not shown) of the lanthanum ferrite coated YSZ particles shows the peaks corresponding to both lanthanum ferrite and YSZ, indicating the presence of both these components in the core-shell particulates. Uniform coverage of shell particulates over the core particulates was confirmed by microscopy and elemental analysis. The energy dispersive X-ray patterns taken at different parts of the core-shell particle (not shown) indicated that pattern taken at the edge of the particle predominantly shows peaks corresponding to lanthanum and iron, the pattern taken at the interior of the particle shows peaks of yttrium and zirconium and pattern taken at the middle shows peaks corresponding to all of the above components confirming the formation of a coating of lanthanum ferrite on the YSZ particles.

Example 3

Ex-situ Dry Method for Preparing Yttria Stabilized Zirconia-lanthanum Ferrite Core-shell Particulates Using a Flux 4.9 grams of YSZ powder, 0.075 gram of $Li_2B_4O_7$ and 0.025 $NaNO_3$ were dissolved in 10 milliliters of deionized water, wherein the flux materials get dissolved/dispersed and the YSZ particles get dispersed. The mixture was thoroughly homogenized by keeping on a rack mill for about 24 hours such that the flux coats the YSZ particles uniformly. The mixture was dried in an oven and the flux coated YSZ particles were subjected to mild heat treatment between 600° C.-700° C. for about 1-2 hours to melt the flux to complete the coating. 4.5 grams of the flux coated YSZ powder particles were thus mixed with 0.5 grams of nanocrystalline $LaFeO_3$ in a 30 milliliter capacity PP bottle and mixed well by shaking. The bottle was then placed on a rack mill for about 24 hours and the powder was then subjected to heat treatment at about 800° C. in a muffle furnace for about 2 hours. The core shell powder thus obtained was then subjected to various analytical techniques such as XRD, SEM, EDS, TEM and BET. The x-ray diffraction pattern of the lanthanum ferrite coated YSZ particles were compared with the XRD patterns of lanthanum ferrite and YSZ. The x-ray diffraction pattern (not shown) of the lanthanum ferrite coated YSZ particles shows the peaks corresponding to both lanthanum ferrite and YSZ, indicating the presence of both these components in the core-shell particulates. Uniform coverage of shell particulates over the core particulates was confirmed by microscopy and elemental analysis. The energy dispersive X-ray patterns taken at different parts of the core-shell particle (not shown) indicated that pattern taken at the edge of the particle predominantly shows peaks corresponding to lanthanum and iron, the pattern taken at the interior of the particle shows peaks of yttrium and zirconium and pattern taken at the middle shows peaks corresponding to all of the above components confirming the formation of a coating of lanthanum ferrite on the YSZ particles.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A core-shell ceramic particulate comprising:
   a core particulate structure comprising a plurality of primary particulates and a plurality of primary pores disposed between the primary particulates; and
   a shell at least partially enclosing the core particulate structure;
   wherein each of the primary particulates comprises a plurality of secondary particulates and a plurality of secondary pores disposed between the secondary particulates; and
   wherein the shell comprises a plurality of tertiary particulates and a plurality of tertiary pores disposed between the tertiary particulates.

2. The core-shell ceramic particulate of claim 1, wherein the core-shell particulate structure further comprises a plurality of the tertiary particulates and a plurality of tertiary pores disposed within the core particulate structure.

3. The core-shell ceramic particulate of claim 2, wherein the plurality of tertiary particulates and the plurality of tertiary pores disposed within the core particulate structure substantially enclose at least one of the primary particulates.

4. The core-shell ceramic particulate of claim 2, wherein the plurality of tertiary particulates and the plurality of tertiary pores disposed within the core particulate structure substantially enclose substantially all of the primary particulates.

5. The core-shell ceramic particulate of claim 2, wherein the plurality of tertiary particulates and the plurality of tertiary pores disposed within the core particulate structure substantially enclose at least one secondary particulate.

6. The core-shell ceramic particulate of claim 1, wherein the tertiary particulates and tertiary pores disposed within the core structure substantially enclose substantially all of the secondary particulates.

7. The core-shell ceramic particulate of claim 1, wherein the plurality of primary pores has a median primary pore diameter, the plurality of secondary pores has a median secondary pore diameter, and the plurality of tertiary pores has a median tertiary pore diameter; and
   wherein the median primary pore diameter is different from the median pore diameter of at least one selected from the group consisting of the plurality of secondary pores and the plurality of tertiary pores.

8. The core-shell ceramic particulate of claim 7, wherein the median primary pore diameter is larger than the median pore diameter of at least one selected from the group consisting of the plurality of secondary pores and the plurality of tertiary pores.

9. The core-shell ceramic particulate of claim 8, wherein the median primary pore diameter is larger than the median secondary pore diameter by a factor of at least 2.

10. The core-shell ceramic particulate of claim 9, wherein the median primary pore diameter is larger than the median secondary pore diameter by a factor of at least 10.

11. The core-shell ceramic particulate of claim 8, wherein the median primary pore diameter is larger than the median secondary pore diameter, and wherein the median secondary pore diameter is lesser than the median tertiary pore diameter.

12. The core-shell ceramic particulate of claim 11, wherein the median primary pore diameter is larger than the median secondary pore diameter by a factor of at least 2, and wherein the median tertiary pore diameter is larger than the median secondary pore diameter by a factor of at least 2.

13. The core-shell ceramic particulate of claim 1, wherein the core particulate structure has a largest dimension in the range from about 1 micrometer to about 150 micrometers.

14. The core-shell ceramic particulate of claim 1, wherein the core particulate structure has a largest dimension in the range from about 5 micrometer to about 50 micrometers.

15. The core-shell ceramic particulate of claim 1, wherein the core particulate structure has a porosity in a range from about 10% to about 60%.

16. The core-shell ceramic particulate of claim 1, wherein the core particulate structure has a porosity in a range from about 25% to about 50%.

17. The core-shell ceramic particulate of claim 1, wherein the plurality of primary pores has a median pore diameter in the range from about 50 nanometers to about 500 nanometers.

18. The core-shell ceramic particulate of claim 1, wherein the plurality of secondary pores has a median pore diameter in the range from about 1 nanometer to about 20 nanometers.

19. The core-shell ceramic particulate of claim 1, wherein the plurality of tertiary pores has a median pore diameter in the range from about 5 nanometers to about 500 nanometers.

20. The core-shell ceramic particulate of claim 1, wherein the plurality of primary particulates has a median particle size in the range from about 100 nm to about 1 micron.

21. The core-shell ceramic particulate of claim 1, wherein the plurality of primary particulates has a median particle size in the range from about 300 nm to about 700 nanometers.

22. The core-shell ceramic particulate of claim 1, wherein the plurality of secondary particulates has a median particle size in the range from about 2 nanometers to about 50 nanometers.

23. The core-shell ceramic particulate of claim 1, wherein the plurality of tertiary particulates has a median particle size in the range from about 5 nanometers to about 300 nanometers.

24. The core-shell ceramic particulate of claim 1, wherein the core particulate structure comprises a material selected from the group consisting of an oxide, a nitride, a carbide, a boride, a chalcogenide, and combinations thereof.

25. The core-shell ceramic particulate of claim 24, wherein the oxide comprises a material selected from the group consisting of zirconia, yttria stabilized zirconia, alumina, titania, ceria, doped ceria, gadolinia-doped ceria, samaria-doped ceria, silica, yttria, zinc oxide, tin oxide, and magnesium oxide.

26. The core-shell ceramic particulate of claim 24, wherein the oxide comprises yttria stabilized zirconia.

27. The core-shell ceramic particulate of claim 1, wherein the shell has a thickness of at least about 5 nanometers.

28. The core-shell ceramic particulate of claim 1, wherein the shell has a thickness in the range from about 5 nanometers to about 500 nanometers.

29. The core-shell ceramic particulate of claim 1, wherein the shell has a porosity in a range from about 30% to about 60%.

30. The core-shell ceramic particulate of claim 1, wherein the shell has a porosity in a range from about 40% to about 50%.

31. The core-shell ceramic particulate of claim 1, wherein the shell comprises a material selected from the group consisting of an oxide, a nitride, a carbide, a boride, a chalcogenide, and combinations thereof.

32. The core-shell ceramic particulate of claim 31, wherein the oxide is selected from the group consisting of ferrites, cuprates, ruthenates, chromates, cobaltates, nicklates, phosphates, titanates, manganates, silicates, chromates, and combinations thereof.

33. The core-shell ceramic particulate of claim 32, wherein the shell comprises lanthanum ferrite.

34. An article comprising the core-shell ceramic particulate of claim 1, wherein the article comprises one selected from the group consisting of a membrane, a sensor, an electrode, and a getter.

35. A core-shell ceramic particulate comprising:
   a core particulate structure comprising a plurality of primary particulates and a plurality of primary pores disposed between the primary particulates; and
   a shell at least partially enclosing the core particulate structure;
   wherein each of the primary particulates comprises a plurality of secondary particulates comprising yttria stabilized zirconia and a plurality of secondary pores disposed between the secondary particulates; and
   wherein the shell comprises a plurality of tertiary particulates comprising lanthanum ferrite and a plurality of tertiary pores disposed between the tertiary particulates.

36. A core-shell ceramic particulate comprising:
   a core particulate structure comprising a plurality of primary particulates and a plurality of primary pores disposed between the primary particulates, wherein each of the primary particulates comprises a plurality of secondary particulates and a plurality of secondary pores disposed between the secondary particulates; and
   a shell at least partially enclosing the core particulate structure, wherein the shell comprises a plurality of tertiary particulates and a plurality of tertiary pores disposed between the tertiary particulates;
   wherein the core-shell particulate structure further comprises a plurality of the tertiary particulates disposed to substantially enclose at least one of the secondary particulates and to substantially enclose at least one of the primary particulates.

37. A membrane comprising the core-shell ceramic particulate of claim 36.

38. An article comprising:
   a plurality of core-shell ceramic particulates, wherein the core-shell ceramic particulate comprises a core particulate structure comprising a plurality of primary particulates and a plurality of primary pores disposed between the primary particulates; and
   a shell at least partially enclosing the core particulate structure;
   wherein each of the primary particulates comprises a plurality of secondary particulates and a plurality of secondary pores disposed between the secondary particulates; and
   wherein the shell comprises a plurality of tertiary particulates and a plurality of tertiary pores disposed between the tertiary particulates.

39. The article of claim 38, wherein the core-shell particulate structure further comprises a plurality of the tertiary particulates and a plurality of tertiary pores disposed within the core particulate structure.

40. The article of claim 39, wherein the plurality of tertiary particulates and the plurality of tertiary pores disposed within the core particulate structure substantially enclose at least one of the primary particulates.

41. The article of claim 38, wherein the article comprises a sintered structure.

42. The article of claim 38, wherein the article is a membrane.

43. The article of claim 38, wherein the article is an electrode in a solid state fuel cell.

44. A method comprising:
providing a core particulate structure comprising a plurality of primary particulates and a plurality of primary pores disposed between the primary particulates, wherein each primary particulate comprises a plurality of secondary particulates and a plurality of secondary pores disposed between the secondary particulates; and
disposing a shell comprising a plurality of tertiary particulates and a plurality of tertiary pores disposed between the tertiary particulates onto the core particulate structure.

45. The method of claim 44, wherein providing the core particulate structure comprises sintering a plurality of particulates of a core-material to obtain a core particulate structure.

46. The method of claim 44, wherein the core particulate structure has a largest dimension In the range from about 1 micrometer to about 150 micrometers.

47. The method of claim 44, wherein the shell has a thickness of at least about 5 nanometers.

48. The method of claim 47, wherein providing the core particulate structure further comprising heating the core particulate structure In a flux at a temperature ringing from about 600° C. to about 1200° C.

49. The method of claim 48, wherein the flux comprises a material selected from the group consisting of a fluride, a borate, a nitrate, a chloride, an oxide, an iodide, an alkali carbonate, an alkaline-earth carbonate, and combinations thereof.

50. The method of claim 49, wherein the flux comprises lithium tetra borate.

51. The method of claim 44, wherein disposing the shell onto the core particulate structure comprises mechanical mixing of the core particulate structure together with a shell material.

52. The method of claim 44, wherein disposing the shell onto the core particulate structure comprises:
mixing the core particulate structure and a dispersion of a shell material in a solvent to obtain a coated core particulate structure; and
heat treating the coated core particulate structure to obtain a core-shell ceramic particulate.

53. The method of claim 44, wherein disposing the shell onto the core particulate structure comprises:
mixing the core particulate structure and a precursor solution of a shell material; and
precipitating the shell-material from the precursor solution onto the core particulate structure to obtain a core-shell ceramic particulate.

* * * * *

UNITED STATES PATENT AND TRADEMARK OFFICE
CERTIFICATE OF CORRECTION

| | | |
|---|---|---|
| PATENT NO. | : 7,670,679 B2 | Page 1 of 1 |
| APPLICATION NO. | : 11/442732 | |
| DATED | : March 2, 2010 | |
| INVENTOR(S) | : Krishna et al. | |

It is certified that error appears in the above-identified patent and that said Letters Patent is hereby corrected as shown below:

In Column 19, Line 23, in Claim 46, delete "In" and insert -- in --, therefor.

In Column 19, Line 29, in Claim 48, delete "In" and insert -- in --, therefor.

In Column 19, Line 29, in Claim 48, delete "ringing" and insert -- ranging --, therefor.

Signed and Sealed this

Eighth Day of June, 2010

David J. Kappos
*Director of the United States Patent and Trademark Office*